US006951061B1

United States Patent
Rosetti

(12) United States Patent  
(10) Patent No.: US 6,951,061 B1  
(45) Date of Patent: Oct. 4, 2005

(54) RIGHT PERSPECTIVE DRAWING TOOL

(75) Inventor: Elizabeth Rosetti, 5206 Whetstone Rd., Biloxi, MS (US) 39532

(73) Assignee: Elizabeth Rosetti, D'Iberville, MS (US)

(*) Notice: Subject to any disclaimer, the term of this patent is extended or adjusted under 35 U.S.C. 154(b) by 52 days.

(21) Appl. No.: 10/764,643

(22) Filed: Jan. 27, 2004

(51) Int. Cl.$^7$ ............................. G01B 3/10; B43L 9/04
(52) U.S. Cl. .......................................... 33/760; 33/768
(58) Field of Search .......................... 33/755, 758, 759, 33/760, 761, 768, 770, 27.03, 27.031, 27.032; 116/DIG. 24

(56) References Cited

U.S. PATENT DOCUMENTS

| | | | | |
|---|---|---|---|---|
| 2,349,670 A | * | 5/1944 | Moxey | 33/27.03 |
| 2,582,488 A | * | 1/1952 | Kroenlein | 33/27.03 |
| 2,681,633 A | * | 6/1954 | Basso | 116/28 R |
| 3,120,059 A | * | 2/1964 | Quenot | 33/27.03 |
| 4,023,277 A | * | 5/1977 | Fizer | 33/27.03 |
| 4,916,820 A | * | 4/1990 | Kozyrski et al. | 33/42 |
| 4,924,597 A | * | 5/1990 | Tursi | 33/758 |
| 5,253,421 A | * | 10/1993 | Landmark | 33/27.03 |
| 5,497,558 A | * | 3/1996 | Wagner | 33/27.03 |
| 2004/0025364 A1 | * | 2/2004 | Elder et al. | 33/770 |

FOREIGN PATENT DOCUMENTS

FR 2706031 A * 12/1994 ............ G01B 3/10
JP 2003130602 A * 5/2003 ............ G01B 3/10

* cited by examiner

*Primary Examiner*—R. Alexander Smith

(57) ABSTRACT

The Right Perspective Drawing Tool invention consist of a typical tape measure with a housing enclosing a retractable coiled tape, tape tip, and locking mechanism with a suction cup attached to the bottom of the unit. The domed-top of the suction cup is inside the housing and the neck fits a hole in the bottom of the housing allowing the unit to swivel 360 degrees and suction onto a flat surface. This unit will allow students or professionals to draw the illusion of a building having a three-dimensional, realistic contour. What is new in the art to which this invention pertains is that the user can position the unit on a single point and draw all lines pivoting off the same point, like rows of bricks or siding, by simply sliding the tape up or down.

2 Claims, 1 Drawing Sheet

RIGHT PERSPECTIVE DRAWING TOOL

CROSS-REFERENCE TO RELATED APPLICATIONS

Not Applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not Applicable

BACKGROUND OF THE INVENTION

The field of endeavor to which this invention pertains as paraphrased by the applicable U.S. patent Classification definitions or the subject matter of the claimed invention is under Class 33, Geometrical Instruments and 18.3, Perspective Drawing Tools identified under subclass 18.1.

The Right Perspective Drawing Tool, consisting of a typical tape measure with a suction cup added to the bottom of the housing, was invented to help any student or professional involved with representational drawing and perspective view drawing. This includes a wide variety of fields such as Illustration, Interior Design, Architecture, and Fine Arts. Each of these areas applies perspective techniques for different purposes and to varying degrees of thoroughness. Presently an artist who understands basic perspective fundamentals and principles, is faced with the old method of lining up a very long ruler on a single point, the vanishing point, drawing one line, and then realigning the ruler to draw the next line. The Right Perspective Drawing Tool enables the artist to render very detailed drawings quickly and accurately. The unit is anchored to a single point, the established vanishing point, marked by two perpendicular lines drawn on the table top, by the suction cup with cross hairs. The tape is extended by the length needed to reach the drawing area of the object to be rendered and locked in place. The tape is held down with one hand while the user draws a straight line along its edge. Thus the tape acts as a straight edge not a measuring device. Because of its unique pivotal design, the user can slide the tape up or down and draw additional straight lines that all pivot off a single axis or point established as the vanishing point.

BRIEF SUMMARY OF THE INVENTION

The aim of perspective drawing for an artist or draftsman is to create an accurate rendition of a subject with a sense of space and depth, a three-dimensional look, on a flat drawing surface. Artists make use of vanishing points on a horizon line to determine the correct slant of all horizontal lines on the side of a building that converge toward the same vanishing point.

The Right Perspective Drawing Tool uses a modified tape measure with a suction cup inserted in the bottom wall of the tape measure housing to form a single unit. There is a round hole in the bottom wall of the tape measure housing at center. The domed-top of the suction cup is held within the tape measure housing and the neck of the suction cup fits a round hole made to accommodate its size and allow movement but the hole is smaller than the domed-top. The user can press down on the unit to suction it on a flat drawing service like a tabletop and it will swivel at the neck area of the suction cup 360 degrees. This will enable the user to position the tool on an established vanishing point by engaging the pivotal suction cup and, with the tape extended and locked, use the edge of the tape like a straight edge to draw a line. The user can then draw all horizontal lines on the side of a building that converge on the established vanishing point quickly and accurately by slightly moving the tape, up or down, pivoting off the suction cup.

Previous methods made use of a long ruler or straightedge that the user had to position with one end on the vanishing point, then line the ruler up with the line to be drawn on the object to be rendered. The user would then draw the line with the possibility of the straightedge moving off the vanishing point because there was nothing to secure it or keep it from moving while the user drew the line at the far end of the straightedge.

The object of the invention is to give the user the opportunity to anchor the unit to a stationary point on a flat surface and not worry about it moving. This allows the user to concentrate on drawing a line accurately and then pivoting the tape slightly off the same point to draw the next line in the design.

DETAILED DESCRIPTION OF THE INVENTION

Figure 1:
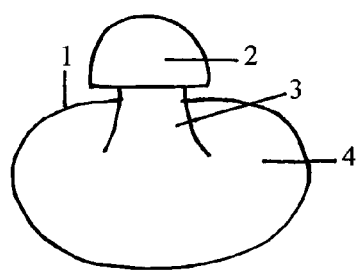
FIG. 1 is the drawing of a suction cup.

FIG. 1 is a drawing of a typical suction cup 1 with a domed-top 2 and a neck 3, both of which protrude upward form the center of the concave base 4.

Figure 2:
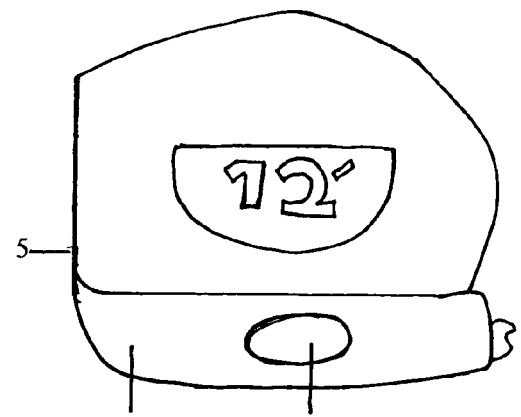
FIG. 2 is the drawing of the bottom wall view of a tape measure housing with a round hole cut in center of the bottom wall.

FIG. 2 is a drawing of a tape measure housing 5, with a view of the bottom wall 6 of the tape measure housing 5, and a round hole 7 in the center of the bottom wall 6 of the tape measure housing 5.

Figure 3:
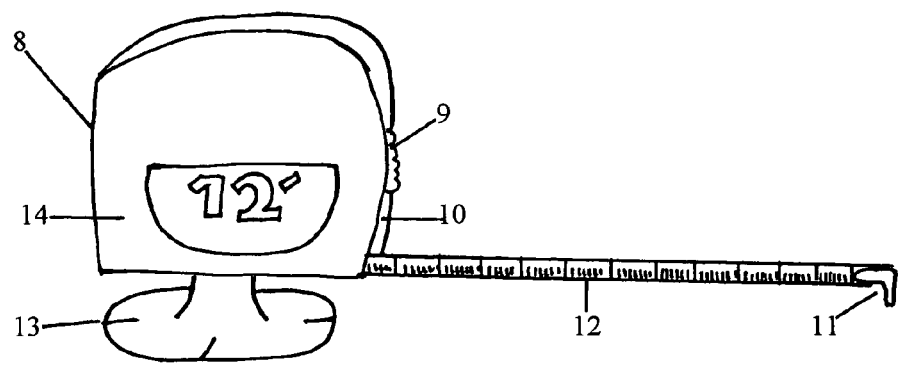
FIG. 3 is a drawing of The Right Perspective Drawing Tool assembly including a typical measuring tape housing and suction cup attached to the bottom wall of the housing.

FIG. 3 is a drawing of The Right Perspective Drawing Tool 8 assembled with both tape measure housing and suction cup. It shows a locking mechanism 9 on front wall 10 of tape measure housing 5, tape tip 11 on end of the steel tape 12, cross hair marking sets 13 on the concave base 4 of suction cup 1 and side wall 14.

Figure 4:
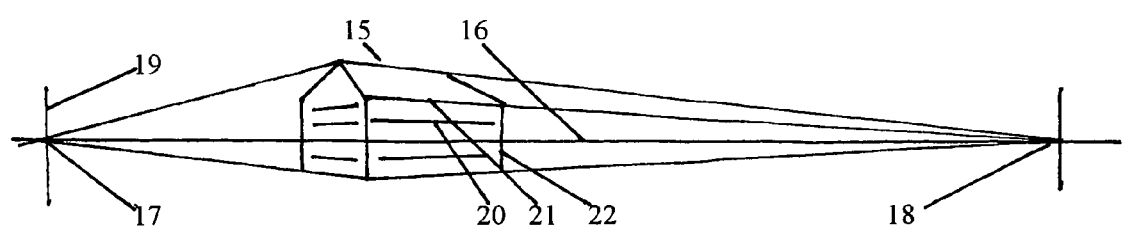
FIG. 4 is a drawing of a house used as an example of how to use The Right Perspective Drawing Tool and to describe perspective drawing terms.

FIG. 4 is a drawing of a house 15 as an example of what a drawing would look like using The Right Perspective Drawing Tool. It defines terms used to describe points and lines necessary to make perspective drawings. The drawing shows a line representing the horizon line 16, a left vanishing point 17, and a right vanishing point 18. The drawing also shows a perpendicular line 19 drawn where the horizon line 16 and left vanishing point 17 intersect and the drawing shows where another perpendicular line 19 is drawn where the horizon line 16 and right vanishing point 18 intersect. Line 20 represents the siding or brick lines on the house drawing 15 and line 21 represents the roofline of the house drawing 15. A perpendicular line 22 represents the edge of a wall of the house drawing 15.

The Right Perspective Drawing Tool is constructed by using a typical tape measure device that includes a housing 5 with side walls 14, a top wall, a bottom wall 6, a front wall 10 and a back wall. The tape measure housing 5 includes a coiled retractable narrow steel tape 12 inside the housing 5. The tape measure housing 5 also includes a tape tip 11 that is a short metal end flange that prevents the free end of the steel tape 12 from entering the tape measure housing 5 when retracted and it provides the user with a means of conveniently grasping the free end of the steel tape 12. On the front wall 10 of the housing there is a locking mechanism 9 that allows the steel tape 12 to be extended to the desired length and locked in position to keep it from retracing into the tape measure housing 5. A round hole 7 is cut into the bottom wall 6 of the tape measure housing 5 at center, large enough to accommodate the neck 3 of the suction cup 1 and smaller than the domed-top 2 of the suction cup 1 as seen in FIG. 1 and FIG. 2. Inserted into this round hole 7 and fitting inside the tape measure housing is the domed-top 2 of the suction cup 1. The tape measure housing 5 swivels 360 degrees at the neck area 3 of the suction cup 1 since the round hole 7 has been made to accommodate the size of the neck 3 with movement. When the suction cup 1, with cross hairs 13, is engaged by using a downward pressure on the tape measure housing 5, it will adhere to a flat surface like a table top and it will swivel freely in all directions for 360 degrees off a single stationary point.

The cross hair sets 13, are perpendicular lines, that are added to the suction cup base 4 so that the user can position the concave base 4 directly over a single point accurately. One of the sets of the cross hairs 13 is lined up with the horizontal line representing the horizon line 16 of the subject to be rendered. The other set of cross hair lines 13 is lined up with the line 19 drawn perpendicular to the horizon line 16 at one of the vanishing points 17 or 18.

The steel tape 12 can then be extended to the length the user needs to reach the drawing or subject to be rendered. The steel tape 12 acts as a straightedge that the user holds down with one hand while drawing a straight line along the tape edge with the other hand. Lines can be drawn, for example, to indicate the siding or bricking on a house 20 and roof lines 21.

In way of definition, in linear perspective, straight horizontal lines that are in reality parallel to each other in nature, seem to meet or converge at a point called a vanishing point as they move away from the viewer, see FIG. 4. To use The Right Perspective Drawing Tool, a horizontal horizon line 16 must be established. As an example, FIG. 4 uses a view of a house with two sides shown to the viewer. The bottom of the house must lay somewhere below the horizon line since it sits on a plane that is closer to the viewer than the horizon line. To use The Right Perspective Drawing Tool, position the suction base 4 on a selected vanishing point, for example the right vanishing point 18. Next line up one set of cross hairs 13 with the horizon line 16 and the opposite set of cross hairs with the perpendicular line 19 at the intersection of horizon line 16 at the right vanishing point 18. Engage the suction cup base 4 by pressing downward on the tape measure housing 5. Extend the steel tape 12 to reach the section of the house drawing 15 to be rendered and use the locking mechanism 9 to lock it in place. The steel tape 12 is used like a straightedge to draw a line then it is moved up or down to draw other lines like rows of bricks or siding 20 or rooflines 21, all of which pivot off the same stationary point, vanishing point 17 or 18. One side of the house is drawn, then The Right Perspective Drawing Tool is moved to the opposite side of the house. To finish the drawing of the house 15, the user must remember that in perspective drawing any line that is perpendicular to the ground in nature 22 will stay perpendicular in the drawing. Draw all perpendicular lines 22 like the edge of the sides of the house with a ruler. This should complete the drawing of the house or building.

This invention differs from other inventions in that other inventions have added a removable suction cup that twists or turns for insertion or other inventions have the suction cup added to a separate, detachable part that can be added to the tape measure housing.

What is claimed is:

1. A right perspective drawing tool for drawing straight lines that radiate from a single point to allow an illustrator, architect, or artist to render a perfect perspective drawing, said tool comprising:

a tape measure including a housing having two side walls, a top wall, a bottom wall, a front wall and a back wall, and a coiled measuring tape enclosed in the housing, said tape having a tip with an end flange that prevents the tip from entering into the housing, said housing including a locking mechanism on the front wall that allows the tape to be extended to the desired length and locked in position, and said tape measure further including a round hole extending through the bottom wall of said housing;

a suction cup having a concave base, a neck, and a domed top wherein said domed top has a larger diameter than a diameter of the neck, wherein said domed top fits through the round hole and secures the suction cup to the tape measure and said neck is sized to accommodate the round hole such that the tape measure can freely swivel 360 degrees around said suction cup, and said tool being adapted so that downward pressure applied to the suction cup secures the tool over a single point on a flat surface while allowing the tape measure to freely swivel through said 360 degrees with said measuring tape forming a straightedge for drawing straight lines that radiate from the single point.

2. The tool of claim 1 wherein the suction cup further includes cross hairs, said cross hairs being adapted to allow a user to accurately position the concave base over the point on the flat drawing surface.

* * * * *